(12) United States Patent
Miller et al.

(10) Patent No.: US 7,872,088 B2
(45) Date of Patent: Jan. 18, 2011

(54) LOW FORMALDEHYDE EMISSION FIBERGLASS

(75) Inventors: William S. Miller, Newark, OH (US); Brian L. Swift, Morristown, IN (US); Scott L. Stillabower, Franklin, IN (US)

(73) Assignee: Knauf Insulation GmbH, Shelbyville, IN (US)

( * ) Notice: Subject to any disclaimer, the term of this patent is extended or adjusted under 35 U.S.C. 154(b) by 767 days.

(21) Appl. No.: 11/675,413

(22) Filed: Feb. 15, 2007

(65) Prior Publication Data

US 2007/0191574 A1  Aug. 16, 2007

Related U.S. Application Data

(60) Provisional application No. 60/774,056, filed on Feb. 16, 2006.

(51) Int. Cl.
  *C08G 14/02* (2006.01)
(52) U.S. Cl. .................. 528/137; 528/129; 528/230; 524/594; 524/596; 524/597; 524/598; 524/818; 524/841; 422/180; 422/331; 525/495; 525/497; 525/498

(58) Field of Classification Search .......... 528/137, 528/129, 230; 422/180, 331; 524/596, 841, 524/504, 818, 597; 525/495, 497, 498
See application file for complete search history.

(56) References Cited

U.S. PATENT DOCUMENTS

| | | | | |
|---|---|---|---|---|
| 3,956,204 A | * | 5/1976 | Higginbottom | 524/25 |
| 5,300,562 A | * | 4/1994 | Coventry et al. | 524/841 |
| 5,710,239 A | * | 1/1998 | Tutin | 528/254 |
| 6,441,122 B1 | * | 8/2002 | DeMott et al. | 528/137 |
| 6,566,459 B1 | * | 5/2003 | Dopico et al. | 525/498 |
| 6,638,882 B1 | * | 10/2003 | Helbing et al. | 442/180 |
| 2006/0084778 A1 | * | 4/2006 | Arbuckle | 528/129 |

* cited by examiner

*Primary Examiner*—Milton I Cano
*Assistant Examiner*—Michael Leonard
(74) *Attorney, Agent, or Firm*—Barnes & Thornburg LLP

(57) ABSTRACT

Disclosed are binders including urea-extended phenol-formaldehyde alkaline resole resins to which melamine-containing resin has been added, and non-woven fiber compositions made therewith. The disclosed binders may be cured to low formaldehyde-emission and low trimethylamine-emission, water-resistant thermoset binders.

3 Claims, 1 Drawing Sheet

LOW FORMALDEHYDE EMISSION FIBERGLASS

CROSS REFERENCE TO RELATED APPLICATION

This application claims the benefit under 35 U.S.C. §119(e) of U.S. Provisional Application Ser. No. 60/774,056, filed Feb. 16, 2006, the disclosure of which is hereby incorporated herein by reference.

TECHNICAL FIELD

The present disclosure pertains to binders and the use thereof to prepare bonded compositions that include non-woven fibers. More particularly, the present disclosure pertains to binders including urea-extended phenol-formaldehyde alkaline resole resins to which melamine-containing resin has been added, and to non-woven fiber compositions made therewith.

BACKGROUND

Fiberglass can be used in a variety of thermal insulation applications including, for example, building insulation, pipe insulation, and in molded automobile parts (e.g., hood liners), as well as in a variety of acoustical insulation applications including, for example, molded automobile parts (e.g., hood and dashboard liners) and office furniture/panel parts. A general discussion of fiberglass manufacturing and technology is contained in *Fiberglass* by J. Gilbert Mohr and William P. Rowe, Van Nostrand Reinhold Company, New York 1978, the disclosure of which is hereby incorporated herein by reference.

Fiberglass insulation products traditionally include matted glass fibers that are bonded together by a cured thermoset binder prepared from resole resin. Resole resin is a phenol-aldehyde resin having a molar ratio of phenol to aldehyde of about 1:1.1 to about 1:5. Preferably, the phenol to aldehyde ratio is from about 1:2 to about 1:3. The phenol component of the resole resin can include a variety of substituted and unsubstituted phenolic compounds. The aldehyde component of the resole resin is preferably formaldehyde, but can include so-called masked aldehydes or aldehyde equivalents, such as acetals or hemiacetals. Specific examples of suitable aldehydes include: formaldehyde, acetaldehyde, propionaldehyde, butyraldehyde, furfuraldehyde, and benzaldehyde.

Highly alkaline phenol-formaldehyde (PF) resole resins, as well as phenol-formaldehyde resole resins extended with urea (PFU resins), are used in conventional processes, and have been relied on heavily over the past several years to prepare PF and PFU binders, respectively, for fiberglass insulation products. Though PFU binders are more cost-effective than PF binders and provide cured fiberglass insulation products with the desired physical properties (e.g., rigidity, tensile strength, water absorption), PFU binders may exhibit some loss in thermosetting properties as the urea content increases. Further, the resulting cured products may have high free formaldehyde and/or high trimethylamine content, as well as a distinctive or unpleasant odor (owing to the presence of formaldehyde and/or trimethylamine, the latter a byproduct of scavenging formaldehyde with urea), that may limit the use of PFU binders in certain applications.

Accordingly, efforts have been made to incorporate other resins and/or additives into PFU binders that can enhance, or at least not diminish, the desired properties of the resulting binders, while also lowering formaldehyde and/or trimethylamine emissions from bonded fiberglass insulation products.

SUMMARY

Research directed to develop low-cost, low formaldehyde-emission and low trimethylamine-emission water-resistant thermoset binders for thermal and acoustical fiberglass insulation has revealed melamine resin-containing PFU thermoset binders that possess such features. These binders are formulatable at alkaline, and therefore non-corrosive, pH. During testing of cured fiberglass insulation prepared with the melamine resin-containing PFU binders described herein, physical properties (e.g., flexural modulus, tensile strength, bond strength) were found to be comparable to those of cured fiberglass insulation prepared with standard PF binder; further, formaldehyde emissions from molded (cured) fiberglass insulation samples prepared with the melamine resin-containing PFU binders described herein were reduced compared with molded (cured) fiberglass insulation prepared with standard PF binder, and emissions of formaldehyde, trimethylamine, and total volatile organic compounds were all below GREENGUARD Indoor Air Quality Certification Program™ emission maxima.

Although the mass of any currently-known binder in a thermal or acoustical fiberglass insulation product is thermally as well as acoustically insignificant, i.e., the contribution of binder to thermal performance and to acoustic performance is essentially nil, melamine resin-containing PFU binders as described herein have not been used heretofore as binders to prepare fiberglass insulation.

In one illustrative embodiment, an aqueous, melamine resin-containing PFU binder composition for use in manufacturing non-woven fiber products, including non-woven fiber products such as fiber products composed of fiberglass and/or other heat-resistant fibers, is described. In one aspect, the aqueous binder composition is thermally-curable. In another aspect, the aqueous binder composition has an alkaline pH. In yet another aspect, the aqueous binder composition includes a sulfonated water-soluble melamine-formaldehyde resin. In still another aspect, the aqueous binder composition thermally cures to a water-resistant thermoset binder, which binder displays low emissions of formaldehyde, trimethylamine, and total volatile organic compounds.

In another illustrative embodiment, a method for treating non-woven fibers, including glass fibers, is described that includes contacting glass fibers with a thermally-curable, alkaline, aqueous, melamine resin-containing PFU binder composition, as described herein, removing water from the thermally-curable, aqueous binder composition in contact with the glass fibers to dehydrate the binder, and, if desired, thermally curing the resulting dehydrated binder composition.

In another illustrative embodiment, a glass fiber product is described that includes a melamine resin-containing PFU binder composition, as described herein, in contact with glass fibers, such as a mat of glass fibers that may be processed to form one of several types of fiberglass insulation, wherein the glass fibers are present in the range from about 80% to about 99% by weight. In one variation, the binder composition is thermally curable. In another variation, the binder composition is thermally cured.

Additional features of the present invention will become apparent to those skilled in the art upon consideration of the following detailed description of illustrative embodiments exemplifying the best mode of carrying out the invention as presently perceived.

DETAILED DESCRIPTION

Figure 1:
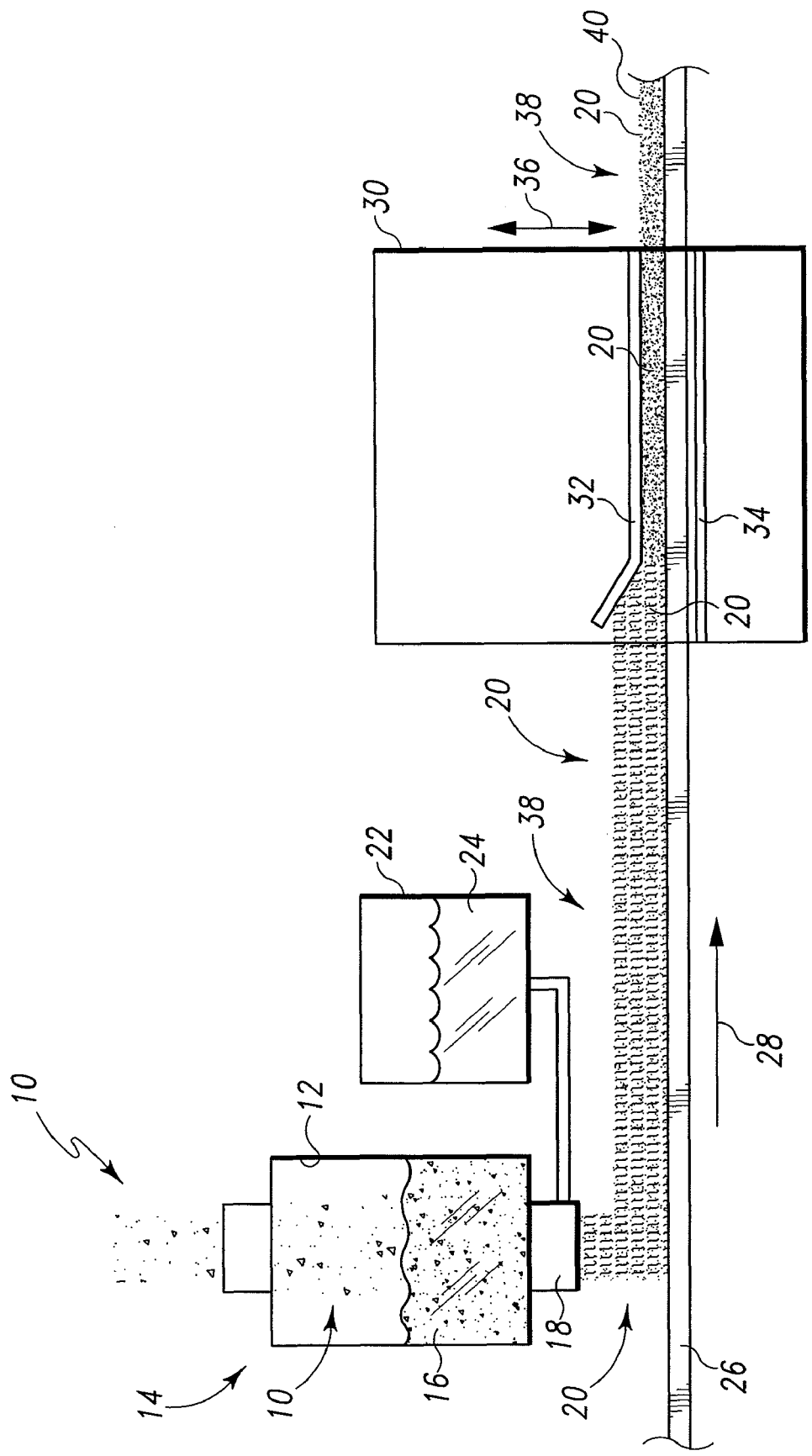
FIG. 1 shows an exemplary schematic that depicts one way of disposing a binder of the present invention onto fibers.

In one illustrative embodiment, a thermally-curable, alkaline, aqueous, melamine resin-containing PFU binder composition is described. In one aspect, the aqueous binder composition thermally cures to an amber-colored, water-resistant thermoset binder, which binder displays low emissions of formaldehyde, trimethylamine, and total volatile organic compounds. The aqueous binder composition may be used as a binder for non-woven fibers, such as, for example, fiberglass in the manufacture of insulation products.

In another illustrative embodiment, a thermally-curable, alkaline, aqueous, melamine resin-containing PFU binder composition includes a phenol-formaldehyde resole resin extended with urea to form a "premix." In one aspect, the premix is about 45 percent to about 50 percent in total solids. In another aspect, the density of the premix is about 10 pounds per gallon. In yet another aspect, the premix contains about 70 percent resole resin solids and about 30 percent urea solids. In still another aspect, the free formaldehyde content of the premix is about 0.5% by weight, based on the total weight of the premix.

In another illustrative embodiment, a thermally-curable, alkaline, aqueous, melamine resin-containing PFU binder composition includes a water-soluble melamine-containing resin. In one aspect, the water-soluble melamine-containing resin is sulfonated. In another aspect, the water-soluble melamine-containing resin is a melamine-formaldehyde resin. In one variation, the melamine-containing resin is a water-soluble, sulfonated melamine-formaldehyde resin as described in U.S. Pat. No. 5,710,239, the disclosure of which is hereby incorporated herein by reference.

In another illustrative embodiment, a thermally-curable, alkaline, aqueous, melamine resin-containing PFU binder composition includes resole resin solids, urea solids, and melamine solids, which collectively represent the total bonding solids of the binder composition. In one aspect, the resole resin solids are present in the aqueous binder composition in the range from about 45 parts by weight to about 50 parts by weight, based on total bonding solids. In another aspect, the urea solids are present in the aqueous binder composition in the range from about 35 parts by weight to about 45 parts by weight, based on total bonding solids. In yet another aspect, the melamine solids are present in the aqueous binder composition in the range from about 10 parts by weight to about 15 parts by weight, based on total bonding solids. In one variation, the resole resin solids, urea solids, and melamine solids are present in the aqueous binder composition in about 44 parts by weight, about 45 parts by weight, and about 11 parts by weight, respectively, based on total bonding solids, i.e., in the ratio of about 44:45:11. In another variation, the resole resin solids, urea solids, and melamine solids are present in the aqueous binder composition in about 52 parts by weight, about 35 parts by weight, and about 13 parts by weight, respectively, based on total bonding solids, i.e., in the ratio of about 52:35:13.

In another illustrative embodiment, a thermally-curable, alkaline, aqueous, melamine resin-containing PFU binder composition is uncured when it is applied to a substrate, such as a mat of glass fibers, during production of fiberglass insulation products. The residual heat from the glass fibers and the flow of air through the fibrous mat will generally evaporate most of the water from the binder, thereby leaving the remaining components of the binder on the fibers as a coating of viscous or semi-viscous high-solids liquid. Subsequently, the coated mat, traditionally called "wet blanket," is transferred to an (curing) oven, where heated air is blown through the mat, or to a (curing) mold, where heat may be applied under pressure, to further dry the binder and where thermal curing is accomplished to produce a water-resistant thermoset binder that rigidly attaches the glass fibers together. When the wet blanket is transferred to an (curing) oven for thermal curing, the resulting product is traditionally called "amber blanket." It is to be understood that the drying and thermal curing may occur either sequentially, contemporaneously, or concurrently.

FIG. 1 is an exemplary schematic showing one embodiment of a process for disposing a binder of the present invention onto a substrate such as glass fibers. In particular, as shown in FIG. 1, silica (sand) particles 10 are placed in the interior 12 of a vat 14, where the particles 10 are moltenized to produce molten glass 16. Molten glass 16 is then advanced through a fiberizer 18 so as to fiberize molten glass 16 into glass fibers 20. A container 22 that contains a liquid uncured binder 24 of the present invention is in fluid communication with fiberizer 18 and disposes the liquid uncured binder 24 onto glass fibers 20 so as to bind the fibers together. Glass fibers 20 are placed onto a forming chain 26 so as to form a collection 38 of glass fibers 20. The collection 38 is then advanced in the direction indicated by arrow 28 so as to enter oven 30 where the collection is heated and curing occurs. While positioned in oven 30, collection 38 is positioned between flights 32 and 34. Flight 32 can be moved relative to flight 34 in the direction indicated by arrow 36, i.e., flight 32 can be positioned closer to flight 34 or moved away from flight 34, thereby adjusting the distance between flights 32 and 34. As shown in FIG. 1, flight 32 has been moved relative to flight 34 so as to exert a compressive force on collection 38 as it moves through the oven 30. Subjecting the collection 38 to a compressive force decreases the thickness of collection 38 as compared to its thickness prior to encountering flights 32 and 34. Accordingly, the density of the collection 38 is increased as compared to its density prior to encountering flights 32 and 34. As mentioned above, the collection 38 is heated in the oven 30 and curing occurs so as to produce a cured thermoset binder 40 being disposed on glass fibers 20. The collection 38 then exits oven 30 where it can be utilized in various fiberglass insulation products, e.g., products such as acoustical board, pipe insulation, batt residential insulation, and batt commercial insulation to name a few.

The above description sets forth one example of how to adjust a process parameter to obtain one or more desirable physical/chemical characteristics of a collection of glass fibers bound together by a binder of the present invention, i.e., the thickness and density of the collection is altered as it passes through the oven. However, it should be appreciated that a number of other parameters (one or more) can also be adjusted to obtain desirable characteristics. These include the amount of binder applied onto the glass fibers, the type of silica utilized to make the glass fibers, the size of the glass fibers (e.g., fiber diameter, fiber length and fiber thickness) that make up the collection. What the desirable characteristics are will depend upon the type of product being manufactured, e.g., acoustical board, pipe insulation, batt residential insulation, and batt commercial insulation to name a few. The desirable characteristics associated with any particular product are well known in the art. With respect to what process parameters to manipulate and how they are manipulated to obtain the desirable physical/chemical characteristics, e.g., thermal properties and acoustical characteristics, these can be determined by routine experimentation.

As used herein, the term "thermally-curable" is intended to indicate that a structural or morphological change in the binder occurs upon heating that is sufficient to alter the properties of non-woven fibers to which an effective amount of a binder of the present invention has been applied; such changes include, but are not necessarily limited to, covalent reaction of components of the binder, including cross-linking, improved adhesion of the binder components to the substrate, and hydrogen bonding of binder components.

As used herein, the term "alkaline" is meant to indicate a solution pH that is greater than about 7, and illustratively also less than or equal to about 10.

As used herein, the term "aqueous" includes water and mixtures composed substantially of water and other water-miscible solvents including, but not limited to, alcohols, ethers, amines, polar aprotic solvents, and the like.

As used herein, the term "fiberglass" indicates heat-resistant fibers suitable for withstanding elevated temperatures. Examples of such fibers include, but are not limited to, mineral fibers (e.g., rock fibers), aramid fibers, ceramic fibers, metal fibers, carbon fibers, polyimide fibers, certain polyester fibers, rayon fibers, mineral wool (e.g., glass wool or rock wool), and glass fibers. Illustratively, such fibers are substantially unaffected by exposure to temperatures above about 120° C.

In another illustrative embodiment, a thermally-curable, alkaline, aqueous, melamine resin-containing PFU binder composition includes a silicon-containing coupling agent. Many silicon-containing coupling agents are available from the Dow-Corning Corporation, Petrarch Systems, and the General Electric Company. Illustratively, the silicon-containing coupling agent includes compounds such as silylethers and alkylsilyl ethers, each of which may be optionally substituted, such as with halogen, alkoxy, amino, and the like. In one variation, the silicon-containing compound is an amino-substituted silane, such as, for example, gamma-aminopropyltriethoxy silane (Dow SILQUEST A-1101; Dow Chemical; Midland, Mich.; USA). In another aspect, the silicon-containing compound is gamma-glycidoxypropyltrimethoxysilane (Dow SILQUEST A-187). When employed in an illustrative embodiment, silicon-containing coupling agents such as the aforementioned typically are present in the binder composition in the range of about 0.1 percent to about 1 percent by weight based upon the binder solids.

In another illustrative embodiment, a thermally-curable, alkaline, aqueous, melamine resin-containing PFU binder composition also includes a latent acid catalyst, added de novo or generated in situ, capable of increasing the rate of curing the binder compositions described herein. Illustratively, the latent acid catalyst may be an ammonium salt, such as, for example, ammonium para-toluene sulfonate, ammonium sulfate, ammonium methansulfonate or ammonium phenylsulfonate.

In another illustrative embodiment, a thermally-curable, alkaline, aqueous, melamine resin-containing PFU binder may be prepared by extending an alkaline phenol-formaldehyde resole resin containing an excess of formaldehyde with urea to form a "premix," which premix is agitated to homogeneity and then allowed to react for at least 10 hours, after which time it may be stored at 65° F. and used for approximately four days. The purpose of premixing is to reduce the free formaldehyde content of the phenol-formaldehyde resole resin to a level that does not increase the ammonia demand of binder solutions prepared with the premix. A melamine-containing resin and additional urea are then added, along with water, a silicon-containing coupling agent, and a latent acid catalyst to achieve the desired solids content for being sprayed onto glass fibers as a binder in the manufacture of fiberglass products, such as fiberglass insulation. The adjustment of the solids content of the binder solution and determination of the binder content of the finished fiberglass product can be readily accomplished by those of ordinary skill in the art. By varying the relative amounts of urea and melamine-containing resin added to the premix, a wide range of binder solution compositions can be prepared, wherein the pH of the binder composition is alkaline, and illustratively in the range from greater than about 7 to less than or equal to about 10. It is appreciated that the alkaline, aqueous, melamine resin-containing PFU binder compositions described herein may be advantageous by permitting the use of existing manufacturing equipment in fiberglass manufacturing plants due to common manufacturing processes and curing parameters.

In another illustrative embodiment, a method for treating fibers, including non-woven fibers, is described. In one variation, the method includes contacting glass fibers with a thermally-curable, alkaline, aqueous, melamine resin-containing PFU binder composition, as described herein, wherein the pH of the binder composition is greater than about 7, and illustratively also less than or equal to about 10, and removing water from the thermally-curable, aqueous binder composition to form a dehydrated, thermally-curable binder composition in contact with glass fibers. In another variation, the method includes contacting glass fibers with a thermally-curable, alkaline, aqueous, melamine resin-containing PFU binder composition, as described herein, wherein the pH of the binder composition is greater than about 7, and illustratively also less than or equal to about 10, removing water from the thermally-curable, aqueous binder composition to form a dehydrated, thermally-curable binder composition in contact with glass fibers, and heating the dehydrated, thermally-curable binder composition contacting said fibers at a temperature sufficient to cure the binder composition and produce a water-resistant thermoset binder, which heating may be conducted in an (curing) oven or in a (curing) mold.

In another illustrative embodiment, a glass fiber product is described that includes a melamine resin-containing PFU binder composition, as described herein, in contact with glass fibers, which product may be processed to form one of several types of fiberglass insulation. In one variation, the fiberglass product includes a dehydrated, thermally-curable melamine resin-containing PFU binder composition, as described herein, in contact with glass fibers. In one aspect, the glass fibers are present in the range from about 80% to about 99% by weight. In another variation, the fiberglass product includes a thermally-cured melamine resin-containing PFU binder composition, which composition is a water-resistant thermoset binder, in contact with glass fibers. In one aspect, the glass fibers are present in the range from about 80% to about 99% by weight.

The following examples illustrate specific embodiments in further detail. These examples are provided for illustrative purposes only and should not be construed as limiting the invention or the inventive concept to any particular physical configuration in any way. Numerous modifications and changes to the basic invention may be made by those of ordinary skill in the art without departing from the spirit of the invention.

EXAMPLE 1

Preparation of Glass Fiber Compositions Using (~44:45:11) Melamine Resin-Containing PFU Binder "Premix" was prepared by mixing 1537.2 lb (149.82 gallons) of Georgia Pacific 2894 resin with 658.8 lb (69.16 gallons) of 50% urea solution. The mixture was then agitated to homogeneity and allowed to react for 10 hours at a minimum, after which it can be stored at 65° F. and used for approximately 4 days. Premix prepared with these ingredients is about 50.7% in solids as determined by baking 2 grams of solution at 300° F. for 30 minutes. Density was estimated at 10.03 lb/gallon. Premix as typically prepared is 70% of resin solids and 30% urea solids. The purpose of premixing is to reduce the free formaldehyde content of the phenol-formaldehyde resin to a level that does not increase the ammonia demand of the binders prepared from it. Typically, the formaldehyde content of the phenol-formaldehyde resin is about 7.5%, and premixing reduces the formaldehyde content to about 0.5% at equilibrium.

To 683 lb of water was added 2196 lb of the above premix, 747.2 lb (79 gallons) of GP957D75 Melamine Resin (which is assumed to be 26% solids in the patented melamine resin and 4.5% solids in urea), 858 lb of 50% urea solution, 56 lb of 28% ammonia, 89.9 lb of 66% para-toluenesulfonic acid solution, and 8 lb of A-1101 gamma-aminopropyltriethoxysilane. On a dry basis, this binder formula is 62.9% premix, 12.9% GP957D75 Melamine Resin, 24.2% urea, 0.9% anhydrous ammonia, 4.4% para-toluenesulfonic acid solution, and 0.5% gamma-aminopropyltriethoxysilane. Only the bonding solids (i.e., resole resin solids, urea solids, and melamine solids) add up to 100%. Since the melamine resin is known to contain urea and the premix contains urea, the bonding solids ratio was designed to be about 44:45:11 in resole resin solids, urea solids, and melamine solids, respectively.

The above binder mixture was thoroughly agitated and solids were measured by weight loss of 2 grams baked at 300° F. for 30 minutes. The solids thus measured were within 0.2 percentage points of 39.7%, whereupon the binder batch was transferred to a hold tank from which it was used in the manufacture of an uncured fiberglass insulation product traditionally called "wet blanket," as well as in the preparation of moldable samples of uncured fiberglass insulation. Wet blanket and moldable samples of uncured fiberglass insulation were prepared using conventional manufacturing procedures known in the art; such procedures are described generally above, they are outlined in connection with FIG. 1, and they are also described in U.S. Pat. No. 5,318,990, the disclosure of which is hereby incorporated herein by reference. Uncured fiberglass insulation was made to multiple specifications, with 15% binder content and 5% moisture content being typical, and then cured in a (curing) mold heated to a temperature ranging from 350° F. to 425° F. to produce molded (cured) samples of varying thickness and density. Wet blanket (uncured) fiberglass insulation was transported to a curing oven for manufacture of a cured fiberglass insulation product traditionally called "amber blanket." Curing oven temperature was set at about 460° F. Wet blanket entered the curing oven white to off-white in apparent color, whereas amber blanket exited the curing oven amber in apparent color and well bonded.

EXAMPLE 2

Preparation of (~52:35:13) Melamine Resin-Containing PFU Binder

"Premix" was prepared by mixing 92.72 gallons of Georgia Pacific 2894 resin with 54.23 of 40% urea solution. The mixture was then agitated to homogeneity and allowed to react for 10 hours at a minimum, after which it can be stored at 65° F. and used for approximately 4 days. Premix prepared with these ingredients is about 47.2% in solids as determined by baking 2 grams of solution at 300° F. for 30 minutes. Density was estimated at 9.90 lb/gallon. Premix as typically prepared is 70% of resin solids and 30% urea solids. The purpose of premixing is to reduce the free formaldehyde content of the phenol-formaldehyde resin to a level that does not increase the ammonia demand of the binders prepared from it. Typically, the formaldehyde content of the phenol-formaldehyde resin is about 7.5%, and premixing reduces the formaldehyde content to about 0.5% at equilibrium.

To 65.9 gallons of water was added 146.5 gallons of the above premix, 48.69 gallons of GP957D75 Melamine Resin (which is assumed to be 26% solids in the patented melamine resin and 4.5% solids in urea), 25.36 gallons of 40% urea solution, 6.76 gallons of 19% ammonia, 5.67 gallons of 66% para-toluenesulfonic acid solution, and 4.91 lb of A1101 gamma-aminopropyltriethoxysilane. On a dry basis, this binder formula is 74.3% premix, 15.2% GP957D75 Melamine Resin, 10.5% urea, 1% anhydrous ammonia, 4.4% para-toluenesulfonic acid solution, and 0.5% gamma-aminopropyltriethoxysilane. Only the bonding solids (i.e., resole resin solids, urea solids, and melamine solids) add up to 100%. Since the melamine resin is known to contain urea and the premix contains urea, the bonding solids ratio was designed to be about 52:35:13 in resole resin solids, urea solids, and melamine solids, respectively.

The above binder mixture was thoroughly agitated and solids were measured by weight loss of 2 grams baked at 300° F. for 30 minutes. The solids thus measured were within 0.2 percentage points of 34.3%.

EXAMPLE 3

Testing/Evaluation of Glass Fiber Compositions Prepared with (~44:45:11) Melamine Resin-Containing PFU Binder Density, loss on ignition, flexural modulus, tensile strength, bond strength, and dust level were determined for the amber blanket insulation product prepared with (~44:45:11) melamine resin-containing PFU binder (from EXAMPLE 1), versus a corresponding PF binder/amber blanket insulation product, and the results are shown in Table 1. Emissions testing was conducted for the molded (cured) fiberglass insulation samples prepared with (~44:45:11) melamine resin-containing PFU binder (from EXAMPLE 1), versus corresponding molded (cured) PF binder/fiberglass insulation samples, and the results are shown in Tables 2-3. Specific conditions for performing these tests are as follows:

Density

Density was determined in accordance with internal test method PTL-1, "Test Method for Density and Thickness of Blanket or Batt Thermal Insulation," which is virtually identical to ASTM C167.

Loss on Ignition (LOI)

Loss on ignition was determined in accordance with internal test method K-157, "Ignition Loss of Cured Blanket (LOI)." The test was performed on a sample in a wire tray placed in a furnace at 1000° F., +/−50° F., for 15 to 20 minutes to ensure complete oxidation, after which treatment the resulting sample was weighed.

Flexural Modulus

Flexural modulus was determined in accordance with ASTM D790, "Standard Test Methods For Flexural Properties of Unreinforced and Reinforced Plastics and Electrical Insulating Materials." The flexural modulus of a material is defined as the ratio of stress to strain in flexural deformation. Flexural deformation is a measure of stiffness, i.e., the ability of a material to resist deformation under load.

Tensile Strength

Tensile strength was determined in accordance with an internal test method KRD-161, "Tensile Strength Test Procedure." The test was performed on samples die cut in both the machine direction and the cross-cut machine direction. Samples were conditioned for 24 hours at 75° F. and 50% relative humidity. Ten samples in each machine direction were tested in a test environment of 75° F., 50% relative humidity. The dogbone specimen was as specified in ASTM D638, "Standard Test Method for Tensile Properties of Plastics." A cross-head speed of 2 inches/minute was used for all tests.

Bond Strength

Inter-laminar bond strength was performed using an internal test method KRD-159, "Bond Strength of Fiberglass Board and Blanket Products." Molded specimens with a cross sectional area of 6 inches by 6 inches were glued to 6 inch by 7 inch specimen mounting plates and placed in a fixture that applied the force perpendicular to the surface of the specimen. A cross-head speed of 12 inches per minute was used for all tests.

Dust Testing

Dust testing was performed using internal test procedure K-102, "Packaged Fiber Glass Dust Test, Batt Method." Dust liberated from randomly selected samples dropped into a dust collection box was collected on a filter and the amount of dust determined by difference weighing.

Emissions Testing—General

Molded insulation samples were monitored for emissions of total volatile organic compounds (TVOCs), formaldehyde, total selected aldehydes in accordance with ASTM D5116 ("Standard Guide for Small-Scale Environmental Chamber Determinations of Organic Emissions from Indoor Materials/Products"), the United States Environmental Protection Agency (USEPA), and the State of Washington IAQ Specification of January, 1994. The emission data were collected over a 24-hour exposure period and the resultant air concentrations were determined for each of the potential pollutants. Air concentration predictions were computer monitored based on the State of Washington requirements, which include a standard room loading and ASHRAE Standard 62-1999 ventilation conditions. Product loading is based on standard wall usage of 28.1 $m^2$ in a 32 $m^3$ room.

Emissions Testing—Selected Aldehydes

Molded insulation samples were tested in a small-sized environmental chamber 0.0855 $m^3$ in volume with the chemical emissions analytically measured. Emission of selected aldehydes, including formaldehyde, were measured following ASTM D5197 ("Standard Test Method for Determination of Formaldehyde and Other Carbonyl Compounds in Air (Active Sampler Methodology)") using high performance liquid chromatography (HPLC). Solid sorbent cartridges with 2,4-dinitrophenylhydrazine (DNPH) were used to collect formaldehyde and other low-molecular weight carbonyl compounds in the chamber air. The DNPH reagent in the cartridge reacted with collected carbonyl compounds to form the stable hydrazone derivatives retained by the cartridge. The hydrazone derivatives were eluted from a cartridge with HPLC-grade acetonitrile. An aliquot of the sample was analyzed for low-molecular weight aldehyde hydrazone derivatives using reverse-phase high-performance liquid chromatography (HPLC) with UV detection. The absorbances of the derivatives were measured at 360 nm. The mass responses of the resulting peaks were determined using multi-point calibration curves prepared from standard solutions of the hydrazone derivatives. Measurements are reported to a quantifiable level of 0.2 μg based on a standard air volume collection of 45 L. GREENGUARD Indoor Air Quality Certification Program™ criteria require formaldehyde emission to be less than or equal to 43 μg/$m^2$hr over 24 hours.

Emissions Testing—Total Volatile Organic Compounds (TVOC)

VOC measurements were made using gas chromatography with mass spectrometric detection (GC/MS). Chamber air was collected onto a solid sorbent which was then thermally desorbed into the GC/MS. The sorbent collection technique, separation, and detection analysis methodology has been adapted from techniques presented by the USEPA and other researchers. The technique follows USEPA Method 1P-1B and is generally applicable to $C_5$-$C_{16}$ organic chemicals with a boiling point ranging from 35° C. to 250° C. Measurements are reported to a quantifiable level of 0.4 μg based on a standard air volume collection of 18 L. Individual VOCs were separated and detected by GC/MS. The total VOC measurements were made by adding all individual VOC responses obtained by the mass spectrometer and calibrating the total mass relative to toluene. GREENGUARD Indoor Air Quality Certification Program™ criteria require TVOC, trimethylamine, and total amines emissions to be less than 495 μg/$m^2$ hr, less than 10 μg/$m^2$hr, and less than 20 μg/$m^2$ hr, respectively, over 24 hours.

Emissions Testing—Odor

GREENGUARD Indoor Air Quality Certification Program™ criteria require measurement of odor on a 1 to 5 scale, where 1 represents "mildly pleasant" and 5 represents "strongly objectionable." This is a subjective test using trained panelists. In this test, the odor from a given product must be less than 3.5 to gain GREENGUARD approval.

TABLE 1

Testing Results for Amber Blanket Insulation (Melamine resin-containing PFU Binder vs. Standard PF Binder): Density, Loss on Ignition, Dust, Tensile Strength, Flexural Modulus, and Bond Strength

| Test | PF Binder-FG Amber Blanket Result (= Std) | MPFU Binder[1]-FG Amber Blanket Result (% of Std) | MPFU Binder[2]-FG Amber Blanket Result (% of Std) |
|---|---|---|---|
| Density (lb/$ft^3$) | 6.46 | 7.08 (110%) | 6.06 (94%) |
| Loss on Ignition (%) | 12.31 | 12.63 (103%) | 13.86 (113%) |
| Dust (mg) | 18.69 | 17.69 (95%) | 20.57 (110%) |
| Tensile Strength (psi) | | | |

TABLE 1-continued

Testing Results for Amber Blanket Insulation (Melamine resin-containing PFU Binder vs. Standard PF Binder): Density, Loss on Ignition, Dust, Tensile Strength, Flexural Modulus, and Bond Strength

| Test | PF Binder-FG Amber Blanket Result (= Std) | MPFU Binder[1]-FG Amber Blanket Result (% of Std) | MPFU Binder[2]-FG Amber Blanket Result (% of Std) |
|---|---|---|---|
| Machine Direction | 121 | 59.96 (49%) | 122.8 (101%) |
| Cross Machine Direction | 89 | 49.8 (56%) | 129.3 (145%) |
| Avg. Flexural Modulus (psi) | 105 | 54.88 (52%) | 126.1 (120%) |
| Machine Direction | 4142 | NA (NA) | 2069 (50%) |
| Cross Machine Direction | 2726 | 3195 (117%) | 2182 (80%) |
| Avg. | 3434 | 3195 (93%) | 2126 (62%) |
| Bond Strength (psi) | 2.04 | 1.19 (58%) | 1.49 (73%) |

[1]Melamine resin-containing PFU binder with bonding solids ratio ~44:45:11 (resole resin solids:urea solids:melamine solids)
[2]Low ammonia melamine resin-containing PFU binder with bonding solids ratio ~44:45:11 (resole resin solids:urea solids:melamine solids)

TABLE 2

Emissions Testing on Molded (Cured) Fiberglass Samples Prepared with Melamine resin-containing PFU Binder[1]

| Sample Density (PCF) | Sample Thickness (Inches) | Mold Temp. (° F.) | TMA[2] Emission[5] | Total Amines Emission[5] | HCHO Emission[5] | TVOC[3] Emission[5] | Odor[4] |
|---|---|---|---|---|---|---|---|
| 10 | 0.375 | 375 | 0 | 0 | 8.1 | 7.1 | 2.5 |
| 10 | 0.375 | 375 | 0 | 0 | 6.6 | 8.2 | 2.5 |
| 10 | 0.375 | 425 | 0 | 0 | 1.1 | 7.2 | 2 |
| 28.5 | 0.0625 | 375 | 0.05 | 0.05 | 12.6 | 6.6 | 3.5 |
| 9.5 | 0.375 | 375 | 0 | 0 | 15.8 | 15.9 | 2.5 |
| 2.4 | 0.375 | 375 | 0 | 0 | 11.5 | 9.2 | 2 |
| 6.1 | 1.0 | 375 | 0 | 0 | 15.0 | 17.2 | 3.5 |
| 16.0 | 1.0 | 375 | 1.34 | 1.34 | 16.2 | 21.5 | 3.5 |
| 7.1 | 0.125 | 425 | 0 | 0 | 8.4 | 5.1 | 3 |
| 14.2 | 0.25 | 425 | 0 | 0 | 9.3 | 10.5 | 2.5 |
| 9.5 | 0.375 | 425 | 0 | 0 | 13.3 | 12.2 | 2.5 |
| 7.1 | 0.5 | 425 | 0 | 0 | 12.1 | 10.2 | 2 |
| 3.6 | 0.5 | 425 | 0 | 0 | 6.8 | 5.9 | 2 |
| 12 | 0.154 | N/A | 0 | 0 | 13.3 | 19.6 | 3.5 |
| N/A | N/A | N/A | 0 | 0 | 18.9 | 22.6 | 2.5 |
| 3.7 | 0.406 | N/A | 0 | 0 | 18.9 | 22.6 | 2 |
| 5.0 | 0.406 | N/A | 0 | 0 | 14.7 | 9.6 | 2 |
| 12 | 0.0937 | N/A | 0 | 0 | 7.2 | 24.8 | 3 |
| 10 | 0.375 | 375 | 0 | 0 | 16.3 | 4.6 | 2.5 |
| 10 | 0.375 | 425 | 0.07 | 0.07 | 14.1 | 5.1 | 3.5 |
| 28.5 | 0.0625 | 350 | 0.05 | 0.05 | 12.6 | 6.6 | 3.5 |
| 9.5 | 0.375 | 350 | 0 | 0 | 15.8 | 15.9 | 2.5 |
| 2.4 | 0.375 | 350 | 0 | 0 | 11.5 | 9.2 | 2 |
| 6.1 | 1 | 350 | 0 | 0 | 15 | 17.2 | 3.5 |
| 16 | 1 | 350 | 1.34 | 1.34 | 16.2 | 21.5 | 3.5 |

[1]Binder bonding solids ratio ~44:45:11 (resole resin solids:urea solids:melamine solids)
[2]Trimethylamine
[3]Total volatile organic compounds
[4]Odor quality based on GREENGUARD scale of 1 (mildly pleasant) to 5 (strongly objectionable)
[5]Emission factors at 24 elapsed exposure hours (ug/m$^2 \cdot$ hr)

TABLE 3

Emissions Testing on Molded (Cured) Fiberglass Samples Prepared with Standard PF Binder[1]

| Sample Density (PCF) | Sample Thickness (Inches) | Mold Temp. (° F.) | TMA[2] Emission[5] | Total Amines Emission[5] | HCHO Emission[5] | TVOC[3] Emission[5] | Odor[4] |
|---|---|---|---|---|---|---|---|
| 23.1 | 0.06 | 350 | 0 | 0 | 28.3 | 0 | 3.5 |
| 3.3 | 0.366 | 350 | 0 | 0 | 25 | 0 | 3.5 |
| 9.7 | 0.381 | 350 | 0 | 0 | 69.8 | 0 | 3.5 |

TABLE 3-continued

Emissions Testing on Molded (Cured) Fiberglass Samples Prepared with Standard PF Binder[1]

| Sample Density (PCF) | Sample Thickness (Inches) | Mold Temp. (°F.) | TMA[2] Emission[5] | Total Amines Emission[5] | HCHO Emission[5] | TVOC[3] Emission[5] | Odor[4] |
|---|---|---|---|---|---|---|---|
| 16.1 | 1.015 | 350 | 0 | 0 | 68.85 | 9 | 4 |
| 5.4 | 1.074 | 350 | 0 | 0 | 49.6 | 2.4 | 4 |
| 23.4 | 0.06 | 425 | 0 | 0 | 33.7 | 0 | 3.5 |
| 3.0 | 0.37 | 425 | 0 | 0 | 27.9 | 0 | 2.5 |
| 9.5 | 0.381 | 425 | 0 | 0 | 76.3 | 0 | 3.5 |
| 5.9 | 1.011 | 425 | 0 | 0 | 76 | 6.6 | 2.5 |
| 15.8 | 1.014 | 425 | 0 | 0 | 86.6 | 18.9 | 4 |

[1]PF resole (phenol/formaldehyde) binder
[2]Trimethylamine
[3]Total volatile organic compounds
[4]Odor quality based on GREENGUARD scale of 1 (mildly pleasant) to 5 (strongly objectionable)
[5]Emission factors at 24 elapsed exposure hours (ug/m$^2$ · hr)

While certain embodiments of the present invention have been described and/or exemplified above, it is contemplated that considerable variation and modification thereof are possible. Accordingly, the present invention is not limited to the particular embodiments described and/or exemplified herein.

The invention claimed is:

1. A method for preparing an aqueous binder, said method comprising:
   (a) selecting an aqueous resole resin having a pH greater than about 7, said resin prepared by reacting phenol with excess formaldehyde under alkaline conditions, wherein the free formaldehyde content of the resole resin is about 7.5% by weight, based on the total weight of the resole resin;
   (b) adding to said aqueous resole resin and reacting therewith aqueous urea in an amount to produce a premix containing about 70 parts by weight of resole resin solids and about 30 parts by weight of urea solids, wherein the free formaldehyde content of the premix is about 0.5% by weight, based on the total weight of the premix;
   (c) mixing into said premix a melamine-containing resin and aqueous urea such that resole resin solids, urea solids, and melamine solids are present in said aqueous binder in the range from about 45 to about 50 parts by weight, about 35 to about 45 parts by weight, and about 10 to about 15 parts by weight, respectively, based on the total of resole resin solids, urea solids, and melamine solids; and
   (d) mixing into said premix a latent acid catalyst, wherein said catalyst is generated in situ in said premix from aqueous ammonia and an aqueous organic acid.

2. The method of claim 1, wherein the premix contains about 50 weight percent solids.

3. The method of claim 1, wherein the aqueous organic acid is selected from the group consisting of para-toluenesulfonic acid, sulfuric acid, methanesulfonic acid, and phenylsulfonic acid.

* * * * *